April 19, 1927. Re. 16,595

J. F. BARGHAUSEN

REFRIGERATED DISPLAY COUNTER

Original Filed Jan. 20. 1925 2 Sheets-Sheet 1

INVENTOR
John F. Barghausen.
BY
Albert E. Dietrich
ATTORNEY

April 19, 1927. Re. 16,595

J. F. BARGHAUSEN

REFRIGERATED DISPLAY COUNTER

Original Filed Jan. 20, 1925 2 Sheets-Sheet 2

INVENTOR
John F. Barghausen
BY
Albert E. Dieterich
ATTORNEY

Reissued Apr. 19, 1927.

Re. 16,595

UNITED STATES PATENT OFFICE.

JOHN F. BARGHAUSEN, OF TAKOMA PARK, DISTRICT OF COLUMBIA.

REFRIGERATED DISPLAY COUNTER.

Original No. 1,540,158, dated June 2, 1925, Serial No. 3,658, filed January 20, 1925. Application for reissue filed February 21, 1927. Serial No. 170,038.

The invention generally relates to the art of refrigeration and more particularly to that class of refrigerators adaptable to the preserving by chilling of perishables, such as meats and vegetables, while the same are on public display as in the retail market or the like.

More specifically the invention seeks to provide a refrigerated display counter of neat and attractive appearance, relatively simple and inexpensive of construction and maintenance, in which the articles to be preserved and displayed may be positioned in a chilling chamber in full and convenient view of the prospective purchasers and counter attendant and readily accessible to the latter, and in which an automatically induced, fed, and cleansed preserving and cooling agent circulation is constantly maintained in a manner insuring proper preservation of the articles and rendering possible a structure in which the necessity of all unsightly super-structures and refrigerating piping and coils is eliminated.

Another object is to provide a refrigerated counter of such construction and arrangement of parts that when the doors of the display compartment are opened for access to the interior the cold air within the display space will be held back against spilling out, thereby increasing the efficiency of the refrigeration of the counter.

Again it is an object to provide means to induce a circulation of the air between the display compartment and the cooling space, by pressure-means whereby the natural tendency of the cold air to fall is overcome and currents of cold air are caused to rise to the top of the counter so that it is thereby possible to reverse the usual arrangement observed in the construction of refrigerators and to locate the cooling medium wholly below, rather than (in part at least) above the storage or display compartment.

With the above and other objects in view that will hereinafter appear, the invention further resides in those novel details of construction, combination and arrangement of parts, all of which will be first fully described, then be particularly pointed out in the appended claims, reference being had to the accompanying drawing in which:—

Figure 3 is an end view of the counter, and

Figures 1, 2, 5:
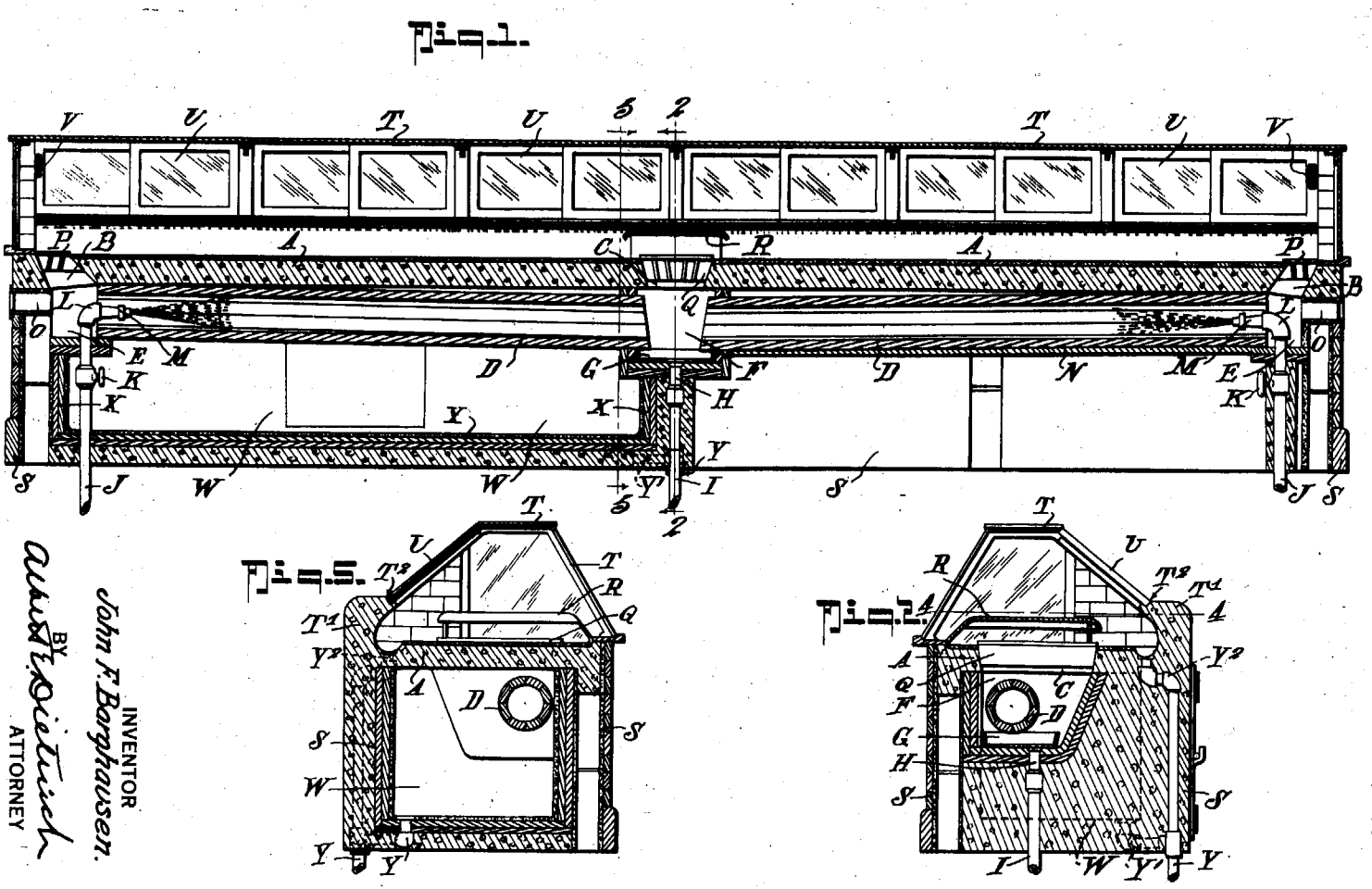
Figure 1 is a vertical longitudinal section taken through the axes of the brine ducts looking toward the back of the counter.
Figure 2 is a transverse vertical section taken on the line 2—2 of Figure 1.
Figure 5 is a transverse vertical section on the line 5—5 of Figure 2.
Figure 4:
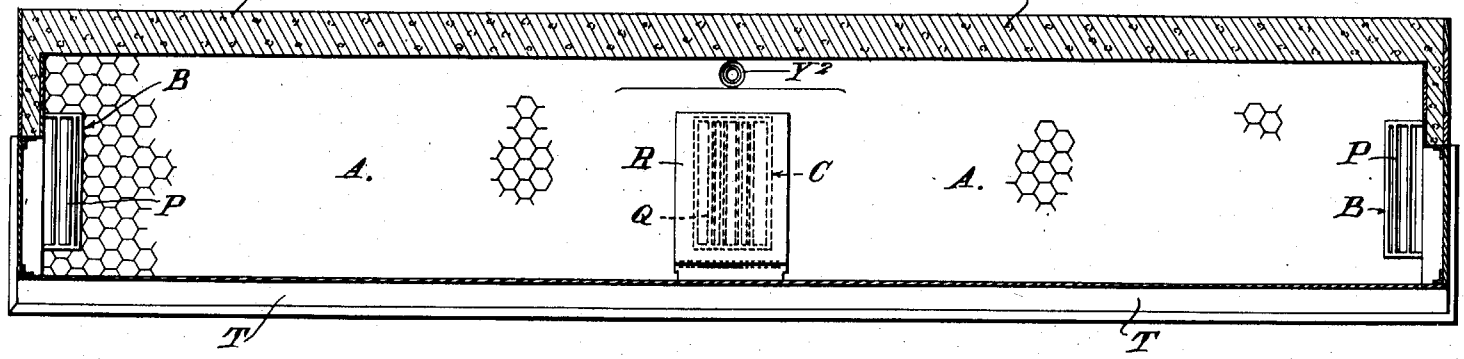
Figure 4 is a horizontal section taken substantially on the line 4—4 of Figure 2.
Figure 5:
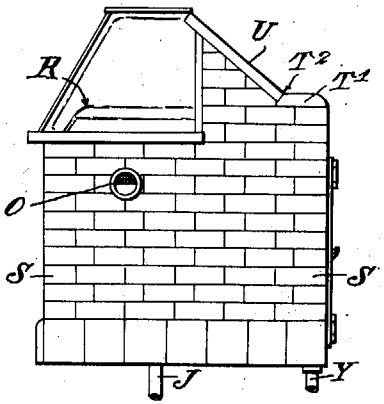
Figure 6:
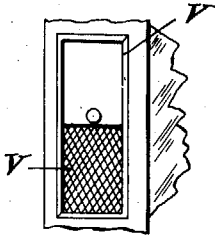
Figure 6 is a detail view of one of the ventilators.

Market patrons are continually demanding greater safeguards in the handling of such products as fresh meats. Display counters equipped with mechanical refrigeration make possible the keeping of such products cool, free from contamination by flies and dust, prevent patrons from handling promiscuously fresh cuts of meats, and at the same time provide for advantageous display of the product offered for sale.

In the common types of refrigerated display counters now in use are usually employed a series of cooling coils. These coils, to be advantageous, must be positioned adjacent the displayed products and hence are as much on display as the products themselves, which is not desirous.

When the cold brine is circulated through the coils they become ice coated and the ice acts, in a degree, to retard refrigerating efficiency. While it may be so that in some types of counters, and in display windows, coils of frost covered pipe attractively arranged may act as an advertising medium, any advertising value that may be attributed thereto is lost in consideration of the waste of space and ideal refrigerating condition occasioned by the positioning of the coils far enough away from the product to overcome all possibility of contact which results in unsightly discoloration of the coils. Moreover, since heat alone will destroy most disease germs, and not cold, the common plans of coil installation cause them to become harboring places for such germs. Still further, when such coils are placed near the glass top, which is the most advantageous location for them, it is necessary to suspend a pan under them to catch the drippings from the melting ice on the coils. Such arrangements not only obstruct, to a certain extent, the full display of the products, but interfere with the proper cleansing of the display section and frequently present an unattractive appearance. Also in such systems the circulation of the cold brine through the coils refrigerates the display section but does not provide for an automatic circulation of air therein, which is quite important.

It is to the deficiencies of construction and arrangement above alluded to that I have addressed my efforts, with the result that I have developed a display counter which I find, after considerable experimentation and a series of practical tests, to be highly efficient and practical and in which all the products are glass enclosed and conveniently displayed without obstruction to view by or displeasing effects of any coils whatever, in which means is provided for proper cleansing, resulting in a greater degree of sanitation and attractiveness than heretofore possible, and in which the refrigeration is so accomplished that a thorough washing and effective circulation of cooling agent air is automatically maintained. In addition to the features of sanitation present in my counter, it is easily possible to maintain a temperature in the display chamber thereof of from 45° to 50° Fahrenheit, in all seasons of the year.

In the practical development of my invention I provide a suitably supported cement top A which forms the floor of and upon which is built the super-structure or glass enclosed cabinet that forms the chilling and display chamber hereinafter again referred to.

The top or floor A is provided with a downwardly-inwardly directed opening B at each end thereof and an upwardly directed opening C centrally of the length thereof, the plan of the said top or floor being that of a long substantially narrow rectangle.

Two cylindrical pipes or ducts D are supported longitudinally beneath the top A and have their entrance ends each beneath and in communication with an end opening B and their discharge ends in spaced and opposed relation beneath the central opening C for a purpose that will later be apparent. It will also be noted that the pipes or ducts D incline slightly toward their discharge ends, the purpose for which will also later appear.

An air receiving chamber E is provided by suitably insulated wall structures beneath and in communication with each end opening B, and a single air deflecting chamber F is provided by suitably insulated wall structures beneath and in communication with the central opening C, the inner walls forming the chambers E and the end walls forming the chamber F serving to support the ends of the pipes or ducts D which pass therethrough in the manner illustrated in Figure 1 of the drawing.

The chamber F is made deep enough to accommodate the positioning of a drain pan G beneath the slightly extended discharge ends of the pipes or ducts D, and a brine drain pipe H communicates with and extends downwardly therefrom, a brine return pipe I being connected with the said drain pipe for a purpose later to be described.

A brine supply pipe J extends upwardly into each air receiving chamber E and is valve equipped as at K to facilitate control of the flow of brine therethrough.

Each pipe J is fitted at its end with a right angled elbow L which turns axially into the entrant end of the respective pipe or duct D to serve as a connection for a spray nozzle M which may be of any structure suitable for ejecting into the duct, toward the discharge end thereof, a finely divided conical spray of brine of an area for contacting the wall of the said duct throughout substantially its whole inside diameter.

Where exposed, the pipes or ducts D are suitably heat insulated as at N.

The supporting walls, end and side, for supporting the top or floor A may be constructed of hollow tile and cement and be suitably heat insulated and glazed tile finished according to taste.

Each end wall is provided with an air induction opening O which communicates with the respective air receiving chamber E beneath the opening B and each opening O is screen covered and controllable as to the degree of opening thereof in any approved manner, as by a rotatable solid cover portion as diagrammatically indicated in Figure 3 of the drawing.

A louvered metal frame P is positioned in each end opening B and the slats of each thereof are directed downward and toward the respective counter end. A louvered metal frame Q is positioned in the central opening C and the slats at each side of the medial line of this frame are directed upwardly and toward the respective counter ends. These frames aid in directing the course of the cooling air and facilitate the maintaining of the center-to-end cooling air circulation at each end of the counter.

A supporting baffle R is positioned above (about 4″) the center opening C, the supports therefor being at front and back so as to leave open ends for directing a flow of cooling air toward each counter end. Obviously this baffle serves as a support for products placed thereon and also as a means for directing circulation of the cooling air as stated. By providing this member, constructed and arranged as shown, the desired circulation of the cooling air is provided for and, as the member R serves also for a product support, the maximum area of cooling and display chamber possible considerate of plan dimensions is obtained and in a manner obviating all necessity of obstruction of display by any means whatever.

The suitably heat insulated walls for enclosing the lower part of and supporting the counter are generally designated S.

Upon the top A is built the glass enclosed superstructure T which encases the cooling and display chamber in a manner affording convenient and unobstructed observation of the displayed product by prospective purchasers. This superstructure is suitably equipped with slide doors U at the rear thereof to facilitate ready access to the interior of the display chamber.

It will be observed by reference to Figures 2 and 3 that the rear wall S and portions of the end wall are elevated above the level of the top slab A and above the top of the baffle R and that the sliding doors U are preferably inclined and have their lower edges in a plane above the baffle R. Elevating the walls as indicated at T′ and the setting back of the lower edges of the door as indicated at $T^2$ so that the door opening comes above the plane of the baffle R, serves to provide a container or pan-like arrangement to trap the coldest air strata within the display space and prevent the cold air spilling out when a door is opened in gaining access to the display compartment. The location of the circulating openings at the places P and Q nearer the front wall of the counter than the rear wall of the counter, as shown in Figure 2, causes the most active air currents to be located forward of the door openings U and also aids in the prevention of loss of cold air by spilling when a door is opened, thus increasing the efficiency of the counter.

Warm air discharge openings V are provided at high points of the superstructure and, like the air induction openings O are screen covered and controllable as to the open area thereof.

A storage compartment W may be provided by the utilization of suitably heat insulated wall and floor sections as illustrated, and when so provided one of the brine ducts D passes therethrough and serves to refrigerate the same as desired. In the structure disclosed in Figure 1 it will be observed that the duct D which passes through the storage compartment is bare, that is, not insulated, while the remaining duct D is suitably heat insulated as at N. The storage compartment is suitably heat insulated as at X.

A suitable drain Y is provided and facilitates the keeping of the counter display and storage chambers in a clean and sanitary condition by permitting frequent washing thereof and the carrying off of the fluid used in that process.

The drain pipe Y has a branch that communicates at Y′ with the storage chamber W and another branch that communicates at $Y^2$ with a low portion of the floor of the display compartment, see full lines in Figure 2.

In operation the valves K are opened permitting the flow of chilled brine to enter the nozzles M under a pressure of approximately 12 pounds. The nozzles eject a conical spray into the entrant ends of the ducts D, and by reason of the fact that the said sprays contact the inner surfaces of the ducts throughout their inside diameter, a partial vacuum is created thereby in each air receiving chamber E, serving to induce the taking in of air through the controlled openings O. The sprays of brine thus perform a triple function; first, the indrawing of air, second, the washing, cleaning and chilling of that air by the salt brine contact, and third, the forcing of the individual columns of air against each other to be deflected, by their contact in the confined deflecting chamber F up into the cooling and display chamber. The brine after having accomplished the purposes stated is deposited into the pan G by reason of the force of ejection and the inclined positions of the ducts D, and passes down through the drain H and return pipe I to any suitable chilling and circulating apparatus for being again forced through the circuit above described. As the chilling and circulating apparatus per se forms no part of the present invention, further detailed disclosure thereof is deemed unnecessary.

As the columns of chilled and cleansed air, deflected upward in the chamber F by opposed contact one with the other, pass upwardly, they are directed, by the oppositely inclined blades of the louvered frame Q and the support baffle R, over the respective ends of the top A and down through the respective end openings B into the air receiving chambers E. In this manner an automatic cooling agent circulation, at each counter end, from center to end through each end of the display and chilling chamber, is created and maintained, the openings O serving to supply the desired amount of fresh air for being chilled and automatically circulated, and the openings V serving to permit discharge of warm and slightly contaminated air as necessary.

The controllable openings O and V will be found particularly effective for properly providing for adjusted ventilation of the counter when provisions remain in the display chamber a considerable interval of time, as during slack business.

It will be apparent, by reference to Figure 1 of the drawing, that the louvered frames P serve to screen from view inside portions of the counter which would otherwise be visible through the openings B in addition to their principal function of aiding in directing the cooling air circulation.

In operating my improved refrigerated display counter I prefer to use sodium chloride brine as the refrigerant in preference to the calcium chloride solution most commonly used in large commercial refrigerating plants. This should be obvious because of the recognized superior cleansing and preserving qualities of the former.

The temperature maintained within the counter is dependent, of course, upon desire, mode of operation and atmospheric conditions. My tests have revealed that normally a 12 to 15 pound pressure on the opposed nozzles, with temperature of the brine of 8° to 18° Fahrenheit, will maintain a temperature of from 45° to 50° Fahrenheit in the cooling and display chamber.

The brine, flowing through drain and return pipes H and I to the chilling and pumping devices, is rechilled to the temperature determined necessary, according to the atmospheric conditions prevailing at the time, and returned again to the nozzles. I have found that the brine will not increase in temperature more than 5° Fahrenheit from the time it enters the counter until its return to the chilling devices, provided the piping is properly insulated.

The disclosure of counter structure herein made is but one concrete embodiment of the principle of my invention which comprehends all structures coming within the scope of the annexed claims. Among the obvious modifications of the specific disclosure made is the employment of an air impelling fan placed in the entrant end of each duct D to create a partial vacuum behind it and to impel the indrawn air over any cooling element within the duct, such as ice or cooling coils. As such a modification would call for the substitution of fans for the nozzles only and the positioning of cooling agents in the ducts, illustration thereof is, of course, unnecessary.

From the foregoing description, taken in connection with the accompanying drawing, it is thought the novel details of construction, manner of operation, and advantages of the invention will be readily apparent to those skilled in the art to which it relates.

What I claim is:

1. A refrigerated display counter having a display and chilling chamber in the upper part thereof, a top slab forming the bottom of and extending the length of the counter and said chamber, the said top slab having an end opening at each end thereof providing passages downwardly out of the said chamber and a central opening therein providing a passage upwardly into the said chamber, and means in communication with the end openings for propelling two flows of a cooling agent to oppose each other beneath the central opening and be deflected upwardly therethrough for the purposes described.

2. A refrigerated display counter having a display and chilling chamber in the upper part thereof, a top slab forming the bottom of and extending the length of the counter and said chamber, the said top slab having an end opening at each end thereof providing passages downwardly out of the said chamber and a central opening therein providing a passage upwardly into the said chamber, and means in communication with the end openings for propelling two flows of a cooling agent to oppose each other beneath the central opening and be deflected upwardly therethrough, and a low positioned support baffle positioned over the said central opening for supporting produce and for directing a circulation of cooling agent toward each end of the counter.

3. A refrigerated display counter having a display and chilling chamber in the upper part thereof, a top slab forming the bottom of and extending the length of the counter and said chamber, the said top slab having an end opening at each end thereof providing passages downwardly out of the said chamber and a central opening therein providing a passage upwardly into the said chamber, and means in communication with the end openings for propelling two flows of a cooling agent to oppose each other beneath the central opening and be deflected upwardly therethrough, a low positioned support baffle positioned over the said central opening for supporting produce and for directing a circulation of cooling agent toward each end of the counter, and a louvered frame in each end opening having the slats thereof directed downwardly-outwardly for the purposes described.

4. A refrigerated display counter having a display and chilling chamber in the upper part thereof, a top slab forming the bottom of and extending the length of the said chamber, the said top slab having an end opening at each end thereof providing passages downwardly out of the said chamber and a central opening therein providing a passage upwardly into the said chamber, and means in communication with the end openings for directing two flows of a cooling agent to oppose each other beneath the central opening and be deflected upwardly therethrough, a low positioned support baffle positioned over the said central opening for supporting produce and for directing a circulation of cooling agent toward each end of the counter, a louvered frame in each end opening having the slats thereof directed downwardly-outwardly, and a louvered frame in the central opening having the slats thereof directed upwardly-outwardly at each side thereof, the said counter also having a controllable air induction opening in communication with the cooling agent flow directing means beneath each end opening and controllable air exhausting openings at high positions in the display and chilling chamber.

5. A refrigerated display counter having a display and chilling chamber in the upper part thereof, a top slab forming the bottom of and extending the length of the said chamber, the said top slab having an end opening at each end thereof providing passages downwardly out of the said chamber and a central opening therein providing a passage upwardly into the said chamber, cooling agent directing ducts having their entrance ends in communication with said end openings beneath the top slab and their discharge ends opposed beneath and in communication with said central opening, and means positioned in said ducts just beyond the entrant ends thereof and directed toward their discharge ends for cooling and forcing the cooling agent through said ducts.

6. A refrigerated display counter having a display and chilling chamber in the upper part thereof, a top slab forming the bottom of and extending the length of the said chamber, the said top slab having an end opening at each end thereof providing passages downwardly out of the said chamber and a central opening therein providing a passage upwardly into the said chamber, cooling agent directing ducts having their entrant ends in communication with said end openings beneath the top slab and their discharge ends opposed beneath and in communication with said central opening, and means positioned in said ducts just beyond the entrant ends thereof and directed toward their discharge ends for cooling and forcing the cooling agent through said ducts, and a low positioned support baffle positioned over the said central opening for supporting produce and for directing a circulation of cooling agent toward each end of the counter.

7. A refrigerated display counter having a display and chilling chamber in the upper part thereof, a top slab forming the bottom of and extending the length of the said chamber, the said top slab having an end opening at each end thereof providing passages downwardly out of the said chamber and a central opening therein providing a passage upwardly into the said chamber, cooling agent directing ducts having their entrant ends in communication with said end openings beneath the top slab and their discharge ends opposed beneath and in communication with said central opening, and means positioned in said ducts just beyond the entrant ends thereof and directed toward their discharge ends for cooling and forcing the cooling agent through said ducts, and a low positioned support baffle positioned over the said central opening for supporting produce and for directing a circulation of cooling agent toward each end of the counter, a louvered frame in each end opening having the slats thereof directed downwardly-outwardly, and a louvered frame in the central opening having the slats thereof directed upwardly-outwardly at each side thereof, the said counter also having a controllable air induction opening in communication with the entrant ends of the ducts and controllable air exhausting openings at high positions in the display and chilling chamber.

8. A refrigerated display counter having a chilling chamber in the top thereof, end openings directed downwardly from and a central opening directed upwardly into the chilling chamber; a pair of relatively small ducts positioned longitudinally of the counter beneath the chilling chamber with the entrant ends thereof in communication with the said end openings and their discharge ends opposed beneath and in communication with said central opening, and nozzles positioned one in each duct entrant end and adapted to eject opposed finely divided conical sprays of chilled brine into the ducts as and for the purposes described.

9. A refrigerator display counter having a chilling chamber in the top thereof, end openings directed downwardly from and a central opening directed upwardly into the chilling chamber; a pair of relatively small ducts positioned longitudinally of the counter beneath the chilling chamber with the entrant ends thereof in communication with the said end openings and their discharge ends opposed beneath and in communication with said central opening, and nozzles positioned one in each duct entrant end and adapted to eject opposed finely divided conical sprays of chilled brine into the ducts, the counter also having controllable air induction openings communicating with the entrant ends of the ducts beneath the end openings and controllable air exhausting openings at high positions in the chilling chamber, as and for the purposes described.

10. A refrigerated display counter having a chilling chamber in the top thereof, end openings directed downwardly from and a central opening directed upwardly into the chilling chamber; a pair of relatively small ducts positioned longitudinally of the counter beneath the chilling chamber with the entrant ends thereof in communication with the said end openings and their discharge ends opposed beneath and in communication with said central opening, and nozzles positioned one in each duct entrant end and adapted to eject opposed finely divided conical sprays of chilled brine into the ducts, the counter also having controllable air induction openings communicating with the entrant ends of the ducts beneath the end openings and controllabe air exhausting openings at high positions in the chilling chamber, and a supporting baffle positioned over the central opening for directing a circulation of chilled air toward each end opening, as and for the purposes described.

11. A refrigerated display counter having a chilling chamber in the top thereof, end openings directed downwardly from and a central opening directed upwardly into the chilling chamber; a pair of relatively small ducts positioned longitudinally of the counter beneath the chilling chamber with the entrant ends thereof in communication with the said end openings and their discharge ends opposed beneath and in communication with said central opening, and nozzles positioned one in each duct entrant end and adapted to eject opposed finely divided conical sprays of chilled brine into the ducts, the counter also having controllable air induction openings communicating with the entrant ends of the ducts beneath the end openings and controllable air exhausting openings at high positions in the chilling chamber, a louvered frame in each end opening having the slats thereof directed downwardly-outwardly, and a louvered frame in the central opening having the slats thereof directed upwardly-outwardly at each side thereof, as and for the purposes described.

12. A refrigerated display counter having a chilling chamber in the top thereof, end openings directed downwardly from and a central opening directed upwardly into the chilling chamber, an air receiving chamber beneath each end opening and a larger air deflecting chamber beneath the central opening, also a controllable air induction opening leading into each air receiving chamber and controllable air exhausting openings at high positions in the chilling chamber; a low support baffle positioned over the central opening and having open ends directed toward the end openings, a pair of restricted ducts circular in cross section and positioned longitudinally of the counter beneath the chilling chamber with their entrant ends one in each air receiving chamber and their discharge ends one in each side of the air deflecting chamber in opposed relation and each on a slight incline toward the said deflecting chamber, nozzles position one in each duct entrant end and adapted to eject finely divided opposed conical sprays of chilled brine into the ducts, and a brine drain leading from the deflecting chamber.

13. A refrigerated display counter having a chilling chamber in the top thereof, end openings directed downwardly from and a central opening directed upwardly into the chilling chamber, an air receiving chamber beneath each end opening and a larger air deflecting chamber beneath the central opening, also a controllable air induction opening leading into each air receiving chamber and controllable air exhausting openings at high positions in the chilling chamber; a louvered frame in each end opening having the slats thereof directed downwardly-outwardly, and a louvered frame in the central opening having the slats thereof directed upwardly-outwardly at each side thereof, a low support baffle positioned over the central opening and having open ends directed toward the end openings, a pair of restricted ducts circular in cross section and positioned longitudinally of the counter beneath the chilling chamber with their entrant ends one in each air receiving chamber and their discharge ends one in each side of the air deflecting chamber in opposed relation and each on a slight incline toward the said deflecting chamber, nozzles positioned one in each duct entrant end and adapted to eject finely divided opposed conical sprays of chilled brine into the ducts, and a brine drain leading from the deflecting chamber.

14. A refrigerated display counter having a chilling chamber in the top thereof, end openings directed downwardly from and a central opening directed upwardly into the chilling chamber; a pair of relatively small ducts positioned longitudinally of the counter beneath the chilling chamber with the entrant ends thereof in communication with the said end openings and their discharge ends opposed beneath and in communication with said central opening, and nozzles positioned one in each duct entrant end and adapted to eject opposed finely divided conical sprays of chilled brine into the ducts, heat insulated walls forming a storage compartment beneath one end of the chilling chamber, heat insulation for one duct, the remaining duct being free of insulation and passing through the storage compartment, as and for the purposes described.

15. In a refrigerated counter, a structure having means for dividing it into an upper relatively high display compartment for the housing of perishable articles, and a relatively low and restricted underlying spraying space, said dividing means having an air descending opening and an air ascending opening for effecting communication between said compartment and said spraying space, means located in the spraying space adjacent the air descending opening and directed toward the air ascending opening for spraying a cooling liquid along said spraying space toward said air ascending opening, thereby to induce a down-flow of warmer air from the upper compartment via the air descending opening and an up-flow of cooler air into the upper compartment via the up-flow opening.

16. In a refrigerated counter, a structure having means for dividing it into an upper relatively high display compartment, and a lower relatively restricted underlying spraying space, said dividing means having an air descending opening and an air ascending opening for effecting communication between said compartment and said spraying space at widely separated points, means located in the spraying space adjacent the air descending opening for directing a spray of cooling liquid along said spraying space toward said air ascending opening, thereby to induce a down-flow of warmer air from the upper compartment via the air descending opening and an up-flow of cooled air into the upper compartment via the up-flow opening.

17. In a refrigerated counter, a structure having means for dividing it into an upper relatively high display compartment, and a lower relatively restricted underlying spraying space, said dividing means having an air descending opening and an air ascending opening for effecting communication between said compartment and said spraying space at widely separated points, means located in the spraying space adjacent the air descending opening for directing a spray of cooling liquid along said spraying space toward said air ascending opening, thereby to induce a down-flow of warmer air from the upper compartment via the air descending opening and an up-flow of cooled air into the upper compartment via the up-flow opening, said spraying means comprising a spray nozzle adapted to discharge into the spraying space, the discharge opening of said nozzle being directed in the same general direction as said spraying space toward the up-flow opening, and adapted to direct the flow of a jet of cooled liquid beneath the base of the display compartment to induce air currents through the relatively restricted spraying space and upwardly through the air ascending opening, and return via the air descending opening for the purpose described.

18. In a refrigerated counter, a structure having means for dividing it into an upper relatively high display compartment, and a lower relatively restricted underlying spraying space, said dividing means having an air descending opening and an air ascending opening for effecting communication between said compartment and said spraying space at widely separated points, means located in the spraying space adjacent the air descending opening for directing a spray of cooling liquid along said spraying space toward said air ascending opening, thereby to induce a down-flow of warmer air from the upper compartment via the air descending opening and an up-flow of cooler air into the upper compartment via the up-flow opening, said spraying means comprising a spray nozzle adapted to discharge into the spraying space, the discharge opening of said nozzle being directed in the same general direction as said spraying space toward the up-flow opening, and adapted to direct the flow of a jet of cooled liquid beneath the base of the display compartment to induce air currents through the relatively restricted spraying space and upwardly through the air ascending opening, and return via the air descending opening, the base of the spraying space being provided with a drain passage for the purpose specified.

19. In a refrigerated counter, a structure having means for dividing it into an upper display compartment and an underlying spraying space, said spraying space being in communication with said compartment at at least two places, at least one spraying device adapted to discharge into the spraying space and itself located in proximity to one of said communicating places and having its discharge directed toward another one of said communicating places whereby to cause air to be drawn down from the display compartment through said first communicating place, propelled along said spraying space, toward and through said other place of communication back into the display compartment to return to the first place of communication.

20. In a refrigerated counter, a structure having means for dividing it into an upper display compartment and an underlying spraying space, said spraying space being in communication with said compartment at at least two places, at least one spraying device adapted to discharge into the spraying space and itself located in proximity to one of said communicating places and having its discharge directed toward another one of said communicating places whereby to cause air to be drawn down from the display compartment through said first communicating place, propelled along said spraying space, toward and through said other place of communication back into the display compartment to return to the first place of communication, and a drain for said spraying space from which the collected liquid is passed out.

21. In a refrigerated counter, a structure having means for dividing it into an upper display compartment and a lower spraying space, said spraying space being in communication, at separated points, with the overlying display compartment through air up-flow and down-flow passages respectively, a pipe having a spraying nozzle adapted to discharge into the spraying space and located in proximity to the down-flow air passage, adapted to direct the flow of a jet of cooled liquid beneath the base of the display compartment to induce air currents through the relatively restricted spraying space and upwardly through the air up-flow passage toward which the jet is directed and to cause said air currents to return via the down-flow air passage, the base of the spraying space being provided with a drain passage adapted to deliver the brine from the counter.

22. In a refrigerated display counter, a chilling chamber at the top, a storage compartment beneath the chilling chamber separated therefrom by a floor, a duct passing through the storage compartment in heat exchange relation thereto and at its ends being in communication with the chilling chamber through openings in said floor, means in said duct and located adjacent one end of the same for causing a circulation of air through the duct and chilling chamber and for cooling the air within said duct, thereby refrigerating the chilling chamber by direct circulation and the storage compartment by virtue of the exposed surface of said duct.

23. In a refrigerated display counter, a chilling chamber at the top, a storage compartment beneath the chilling chamber separated therefrom by a floor, a duct passing through the upper region of said storage compartment in heat exchange relation thereto and at its ends being in communication with the chilling chamber through openings in said floor, means in said duct and located adjacent one end of the same for spraying a chilling liquid along the duct and causing a circulation of air through the duct and chilling chamber and for cooling the air within said duct, thereby refrigerating the chilling chamber by direct circulation and the storage compartment by virtue of the exposed surface of said duct.

24. In a refrigerated counter, an elongated structure having means for dividing it into an upper display compartment and an underlying restricted refrigerating space, said dividing means having openings communicating with said refrigerating space at widely separated places measured along the direction of the length of the counter, said counter having doors at the back of the display compartment, the lower edges of which doors are located a substantial distance above said dividing means whereby to provide an air trap or pan and means in said restricted refrigerating space for forcing a cooling liquid along said space from adjacent one opening to adjacent the other opening to cause the air to circulate from said display compartment through one opening and via said restricted refrigerating space back into said display compartment, and means to gather said cooling liquid for return to said forcing means before said cooling liquid can be passed into said display compartment.

25. In a refrigerated counter, an elongated structure having means for dividing it into an upper display compartment and an underlying restricted refrigerating space, said dividing means having openings communicating with said refrigerating space at widely separated places measured along the direction of the length of the counter, said counter having doors at the back of the display compartment, the lower edges of which doors are located a substantial distance above said dividing means whereby to provide an air trap or pan, said openings being located nearer the front wall of the counter than the rear wall thereof and means in said restricted refrigerating space for forcing a cooling liquid along said space from adjacent one opening to adjacent the other opening to cause the air to circulate from said display compartment through one opening and via said restricted refrigerating space back into said display compartment, and means to gather said cooling liquid for return to said forcing means before said cooling liquid can be passed into said display compartment.

26. In a refrigerator, a structure having means for dividing it into an upper display compartment and a lower air cooling space and a cooling duct in said cooling space, said dividing means having an air descending opening and an air ascending opening for effecting communication between said display compartment and said cooling duct at different points, means located in the air cooling duct adjacent the air descending opening for drawing the air from said air descending opening and forcing it along and through said cooling duct to and through said air ascending opening, and means in said cooling duct for cooling the air passing therethrough.

JOHN F. BARGHAUSEN.